United States Patent [19]
Sanada

[11] 3,978,501
[45] Aug. 31, 1976

[54] DEVICE FOR SETTING CAMERA

[75] Inventor: Noriaki Sanada, Yokohama, Japan

[73] Assignee: Canon Kabushiki Kaisha, Tokyo, Japan

[22] Filed: Oct. 21, 1974

[21] Appl. No.: 516,571

[30] Foreign Application Priority Data
Oct. 29, 1973 Japan............... 48-121405[U]
Feb. 19, 1974 Japan............... 49-19816[U]

[52] U.S. Cl.................... 354/206; 354/204
[51] Int. Cl.²........................ G03B 17/42
[58] Field of Search............. 354/204, 206, 213

[56] References Cited
UNITED STATES PATENTS

| | | | |
|---|---|---|---|
| 2,395,828 | 3/1946 | Kallusch | 354/204 |
| 2,688,279 | 9/1954 | Hodges | 354/206 |
| 3,730,066 | 5/1973 | Ettischer et al. | 354/204 |
| 3,736,854 | 6/1973 | Beach | 354/204 |
| 3,750,545 | 8/1973 | Beach | 354/213 |
| 3,768,389 | 10/1973 | Ettischer et al. | 354/206 |
| 3,774,513 | 11/1973 | Ettischer et al. | 354/206 |
| 3,779,145 | 12/1973 | Ettischer et al. | 354/206 |

*Primary Examiner*—John Gonzales
*Attorney, Agent, or Firm*—Toren, McGeady and Stanger

[57] ABSTRACT

A device for setting a camera in which a film presenting one perforation per picture or frame is used characterized in that upon an operation member, for effecting shutter charging and film winding, a shutter charge member is movably provided and that by means of a fixed cam and a shutter stopping member in functional engagement of a film sensing device the shutter charge member is brought into one position at which the shutter charge member engages with the shutter member or in another position at which the shutter charge member disengages from the shutter member.

3 Claims, 8 Drawing Figures

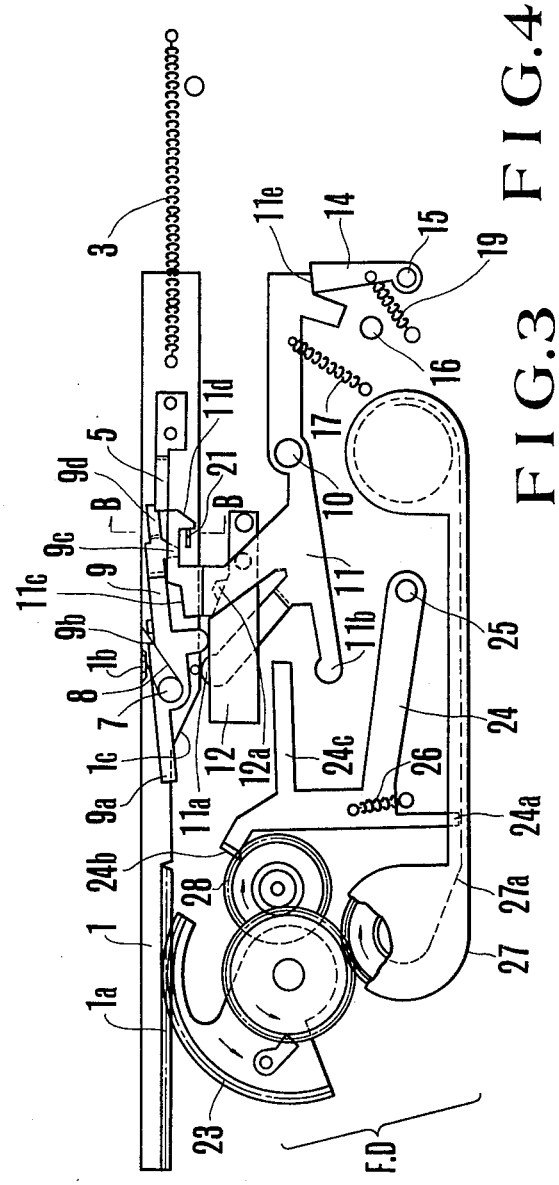

DEVICE FOR SETTING CAMERA

DETAIL EXPLANATION OF INVENTION

The present invention relates to a device for setting a camera.

A mechanism for winding up a certain predetermined length of film for a camera is known in which a film presenting one perforation per picture is used, in which mechanism a detection member entering into each perforation of the film is provided in such a manner that the film winding is ceased by means of the displacement of the detection member which is returned in functional engagement with the shutter release in such a manner that subsequent film winding becomes possible.

It is already known to wind up the leader part of film without taking a photograph until the non exposed part of the film reaches the lens aperture when a film is loaded in a camera. In the case of a film wherein the leader part presents no perforation, the leader part of the film is continuously wound up until the part corresponding to the first picture or frame, of the film comes to the position of the lens aperture. When the above mentioned detection member enters into the first perforation the film winding is ceased and the film is ready for exposure. In such a known camera the film winding is carried out in functional engagement with the shutter mechanism and the shutter is repeatedly charged during the film winding without the taking of any photographs.

This is not only a useless operation but it also produces needless friction to the parts concerned, giving at the same time an unpleasant feeling to the photographer.

The purpose of the present invention is to offer a new device for setting a camera which does not possess the shortcoming mentioned above wherein the shutter is charged only at the first film winding operation, the shutter member being stopped at this position with only the film being wound without any influence from the shutter charging member during the following film winding occurring without the taking of a photograph.

The present invention will be described hereinafter with reference to the drawings showing the preferred embodiments of the present invention.

FIG. 2 shows the state after the completion of the film winding up and before the returning of the operation rod.

FIG. 3 show a section along A—A of FIG. 1,

FIG. 4 show a section along B—B of FIG. 2,

Figure 6:
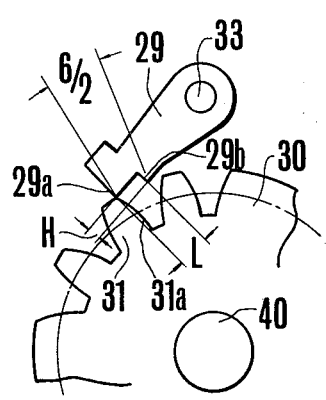
Figure 7:
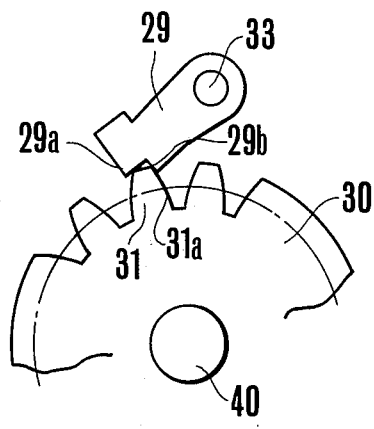

FIGS. 6 and 7 respectively show the operation of the above.

Figure 8:
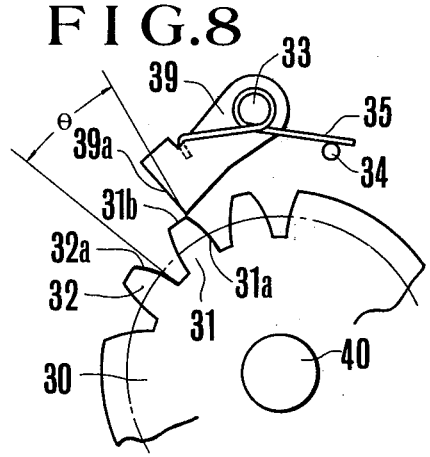

FIG. 8 shows a plane view of a conventional device.

Figure 1:
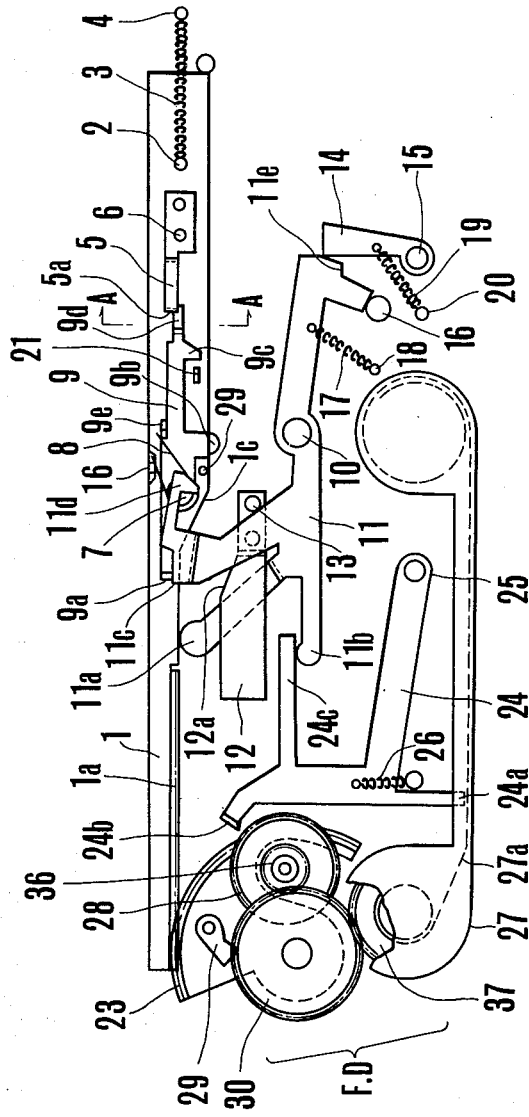
FIG. 1 shows a plane view of the important part of the embodiment of the present invention, whereby the state immediately after the shutter releasing or immediately before the film winding up is shown.

In the drawing 1 is the operation rod or member for shutter charging and film winding up slidably provided on a base plate not shown in the drawing, which presents on a side face a rack 1a engageable with the sector gear 23 of the film winding up mechanism FD and on the upper face a shutter charge lever 9 rotatably provided on the shaft 7. 3 is the return spring of the operation rod 1 provided between a pin 2 on the rod 1 and a pin 4 on the base plate so as to give the rod 1 the tendency to return to the initial position shown in FIG. 1.

The shutter charge lever 9 is forced clockwise by means of the spring 8, but normally stands still supported by the stopper 29, whereby the one end 9d lies on the one inclined face of a bent end 5a of the plate spring 5 fixed on the operation rod 1 by means of a rivet 6. (FIG. 3)

Further the hook 9c of the shutter charge lever 9 is provided so as to engage with the shutter charge arm 21 extending from the shutter case 22 shown in dotted line in FIG. 4, whereby 9b is provided so as to engage with the cam face 12a of the cam plate 12 fixed on the base plate by means of a rivet 13. 9e is a projection for hanging a spring. 11 is a stopping or holding lever presenting a hook 11d for stopping or holding the above mentioned shutter charge arm 21 at the time of shutter charging, provided on the base plate so as to rotate around the shaft 10, forced clockwise by means of the spring 18 and normally stands still being held stationary by means of the stopper 16.

11a is the engaging arm for the cam face 1c of the operation rod 1, 11b the engaging arm for the film sizing lever 24 to be explained later, 11c the engaging shoulder for the bent rear end 9a of the shutter charge lever 9 and 11e the engaging part for the shutter release lever 14.

The film sensing lever 24 is provided on the base plate so as to rotate around the shaft 25 and is forced counter clockwise by means of the spring 26 whereby the detecting foot 24a enters into the perforation of the film, the film winding stopping claw 24b for the gear of the winding mechanism and the engaging claw 24c for the above mentioned stopping lever being provided in one body.

The film 27a loaded in the cartridge 27 presents the leader part at the end attached to the winding spool in the cartridge, whereby the film is wound up by rotating the spool by means of an already known winding mechanism (FD).

When now the operation rod 1 in the state shown in FIG. 1 is pushed to the left against the strength of the spring, the spool is rotated through the ratchet claw 29 to be explained later and the gears 30, 36, 28 and 37 by means of the engagement of the rack 1a with the sector gear 23 so as to wind up the film while the hook 9c of the shutter charge lever 9 on the operation rod 1 engages with the shutter charge arm 21, bringing the arm 21 to the left so as to charge the shutter. When the shutter charge arm 21 passes the position of the hook 11d of the stopping lever 11, the inclined cam 1c of the operation rod engages with the one arm 11a of the stopping lever, rotating the lever 11 counter clockwise so as to bring the above mentioned hook 11d in the movement path of the shutter charge arm 21 in such a manner that the hook 11d becomes ready for engaging with the shutter charge arm 21. The projection 9b of the shutter charge lever 9 engages at the cam face 12a of the fixed cam plate 12, being rotated counter clockwise around the shaft 7 in such a manner that the hook 9c release the shutter charge arm 21, whereby the arm 21 is stopped by means of the stopping lever 11. The end 9d of the shutter charge lever 9 passes the plate spring 5, pushing the spring 5 upwards at the rotation, in such a manner that the end 9d lies on the inclined face opposite to the bent part 5c as is shown in FIG. 4 and is prevented from returning to the initial position, being stopped against the strength of the spring 8. When the stopping lever 11 is rotated counter clockwise, the release lever 14 is rotated by means of the spring until the end of the release lever 14 engages with the engaging part 11e so as to be stopped at the position by means of the cam 1c so that the shutter charge arm 21 of the shutter 22 is also stopped at the shutter charging position. When released in this position the operation rod returns to the position shown in FIG. 1 by means of the spring 3. As mentioned above the leader part of the film has no perforation, so that for this leader part the film sensing lever 24 does not operate. When the film is further wound up by means of the operation rod 1, the shutter charging arm 21 of the shutter is stopped as in the former case so that the hook 9c of the shutter charging lever 9 is kept at a position at which the hook 9c does not interfere with the shutter charging arm 21 and therefore the operation rod carries out the film winding operation without taking a photograph and without influencing the shutter.

When the first perforation comes to the position of the detecting foot 24a of the film sensing lever 24, the detecting foot 24a enters into the perforation by means of the force of the spring 26 while the claw 24b of the other arm engages with the gear 28 of the winding up mechanism as is shown in FIG. 2 so as to stop the winding up operation. Hereby the operation rod is released so as to return to the initial position. When the shutter button is pushed down after it is ready for taking a photograph, the release lever 14 in functional engagement with the release button is rotated counter clockwise against the strength of the spring 19 so as to release the stopping lever 11 so that the stopping lever 11 is rotated clockwise around the shaft 10 by means of the strength of the spring 17 until the hook 11d releases the shutter charging arm 21 returning it to the initial position whereby the shutter completes the opening operation. Hereby the shoulder part 11c of the stopping lever pushes the bent part 9a of the shutter charge lever so as to rotate the shutter charge lever 9 against the force of the plate spring 5 in such a manner that the hook 9c again becomes engageable with the shutter charge arm of the shutter, whereby the arm 24c of the film sensing lever 24 is pushed by the arm 11b of the stopping lever in such a manner that the film sensing lever 24 is rotated clockwise until the foot 24a disengages out of the perforation while the claw 24b releases the gear 28 whereby the next film winding operation becomes possible. From this film winding operation the film is wound up one picture or frame at a time by means of the operation rod 1 while the shutter is charged so that the ordinary photographing can be carried out.

Figure 5:
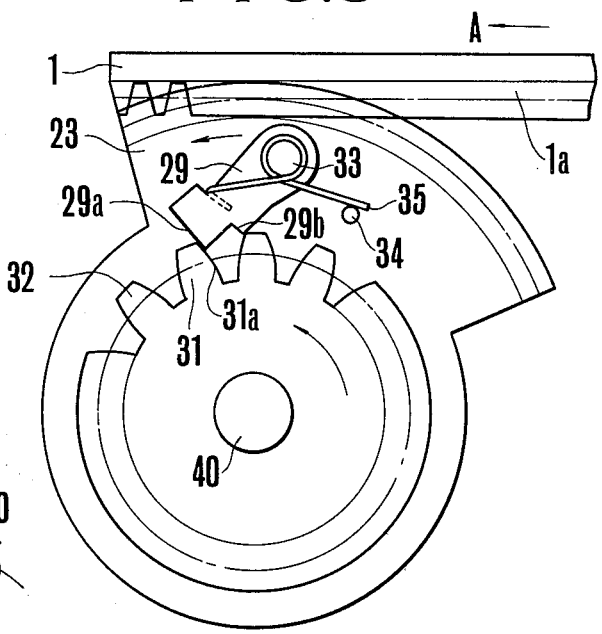
FIG. 5 show a partial enlarged plane view for showing the functional engagement of the operation rod with the film winding up mechanism.

FIG. 5 shows the functional engagement of the above mentioned operation rod 1 with the winding mechanism whereby on the sector gear 23 engagable with the rack 1a a ratchet claw 29 is rotatably provided on the shaft 33, while the end 29a is forced by means of the spring 35 so as to engage with the teeth of the pinion 30 in such a manner that a ratchet mechanism which transfers the movement of the operation rod 1 to the pinion 30 only when the operation rod 1 is moved along the direction of the arrow A is formed.

In case a gear of the driving gears is made use of as a ratchet wheel in this way it is difficult to choose the number of the teeth and the shape of the teeth is not always suited for feeding the ratchet so that much lost motion takes place during the operation. Hereby it is already known to provide a plural number of ratchet claws to compensate for the above mentioned shortcoming.

FIG. 8 shows a plane view for explaining the lost motion which occurs during this operation.

When as shown in the drawing the ratchet claw 39 is stationary, being engaged with a part near the end of a tooth 31 of the pinion 30 and the sector gear 23 is rotated counter clockwise by means of the operation rod 1, the claw 39 does not work upon the pinion at all over the angle $\theta$ in which the claw 39, sliding over the tooth face 31a, engages with the next tooth 32 so that the movement of the operation rod in this interval becomes a loss.

The maximum value of this loss almost corresponds to one pitch of the teeth of the pinion 30.

Although it is possible to reduce the angle for the loss for example by providing two ratchet claws at the angle of $180° \pm \frac{1}{2}\theta$ around the pinion, the space is limited by the space within the camera so that the actual arrangement is often difficult to realize.

According to the present invention such a loss angle as mentioned above is reduced by providing a plural number of engaging parts on the ratchet claw.

As is shown in FIGS. 5 to 7 the ratchet claw 29 presents two engaging parts 29a and 29b, whereby it is so constructed that either of the engaging parts engages with the tooth of the pinion so as to transfer the driving power to the pinion.

When the operation rod 1 stops after several reciprocal movements and then the engaging parts 29a or 29b of the ratchet claw 29 is in engagement with the tooth of the pinion as is shown in FIG. 5 or FIG. 7, the pinion 30 immediately starts to rotate by the movement of the operation rod, while when as shown in FIG. 6 the engaging part 29a stops, striking at the end of the tooth 31, and the operation rod is operated, the claw slides over the tooth face 31a so as to disengage from the tooth while the next engaging part 29b engages with the tooth face 31a so as to rotate the pinion 30. The distance between the engaging parts 29a and 29b of ratchet claw 29 corresponds to the half of the pitch of the teeth of the pinion 30, whereby it is possible to reduce the maximum loss angle down to $\frac{1}{2}\theta$ by setting the depth H of the notch properly in accordance to the module of the pinion.

What is claimed is:

1. A device for setting a camera including a shutter and particularly suitable for utilizing film having one perforation per frame comprising a reciprocally movable operation member, film winding means arranged to be driven by said operation member for winding said film, a shutter member movable to a shutter charged position for charging said shutter and to a shutter release position when said shutter is released, shutter charging means pivotally mounted upon said operation member and movable to a shutter member engaging position to charge said shutter upon actuation of said operation member and to a shutter member releasing position after movement of said shutter member to said shutter charged position, fixed cam means engaging said shutter charging means upon actuation of said operation member to wind film in said camera in order to displace said shutter charging means from said shutter member engaging position to said shutter member releasing position, and a holding lever pivotally mounted for movement to a position engaging said shutter member to hold said shutter member in said shutter charged position after said shutter member has been moved to said shutter charged position and released by said shutter charging means and to a shutter member releasing position, said operation member being repeatedly reciprocally movable to wind film while said holding lever holds said shutter member with said shutter in said charged position, said holding lever being moved to release said shutter member and said shutter charging means being moved to said shutter member engaging position upon operation of said camera to release said shutter, said shutter charging means operating to return said shutter member to said shutter charged position upon subsequent actuation of said operating member.

2. A device according to claim 1, including film perforation sensing means for sensing perforations in film in said camera and for preventing winding of said film by actuation of said operation member when a film perforation is sensed, said film sensing means including a film perforation detecting member and a film winding stopping member, said film winding stopping member being operable to engage said film winding means to prevent winding of film in said camera when said film perforation detecting member detects a perforation in said film, said film winding stopping member releasing said film winding means upon operation of said camera to release said shutter.

3. A device according to claim 1 further including a ratchet mechanism operably engaged between said operation member and said film winding means, said ratchet mechanism including a pinion on said film winding means and a ratchet claw on said operation member engaging said pinion to drive said film winding means, said ratchet claw comprising a plural number of pinion engaging parts for engaging said pinion to wind said film.

* * * * *